United States Patent [19]

Sobue et al.

[11] Patent Number: 4,839,949
[45] Date of Patent: Jun. 20, 1989

[54] ROLLERS FOR ROLLING MILLS

[75] Inventors: Masahisa Sobue, Mito; Sensuke Okada; Kimihiko Akahori, both of Katsuta; Keiichi Kuniya, Hitachi; Toshimi Sasaki, Mito; Toshiyuki Kajiwara, Hitachi; Tomoaki Kimura, Hitachi; Mitsuo Nihei, Hitachi, all of Japan

[73] Assignee: Hitachi, Ltd., Tokyo, Japan

[21] Appl. No.: 48,907

[22] Filed: May 12, 1987

Related U.S. Application Data

[63] Continuation of Ser. No. 601,358, Apr. 18, 1984, abandoned.

[30] Foreign Application Priority Data

Apr. 22, 1983 [JP] Japan .................................. 58-69918

[51] Int. Cl.$^4$ ............................................. B21B 27/00
[52] U.S. Cl. ......................................... 29/132; 29/110
[58] Field of Search ................. 29/132, 125, 123, 110; 501/92

[56] References Cited

U.S. PATENT DOCUMENTS 4,487,734 12/1984 Sawamura ........................... 501/92

FOREIGN PATENT DOCUMENTS 2449874 4/1976 Fed. Rep. of Germany ........ 29/125
1004057 7/1974 Japan .................................... 29/132

Primary Examiner—Joseph M. Gorski
Attorney, Agent, or Firm—Antonelli, Terry & Wands

[57] ABSTRACT

A roller for rolling mill comprising an entirely non-metallic sintered body composed principally of at least one material selected from silicon carbide, silicon nitride, sialon, alumina and zirconia and having a relative density which is at least 96% of the theoretical density of the sintered body, the roller having an initial crown in the range of −300 μm to +300 μm, is provided. This roller for rolling mill has a high hardness and high wear resistance and can be used as a work roll.

19 Claims, 3 Drawing Sheets

ROLLERS FOR ROLLING MILLS

This is a continuation of application Ser. No. 601,358, filed Apr. 18, 1984, now abandoned.

BACKGROUND OF THE INVENTION

This invention relates to a roller for rolling mills, and more particularly, to a roll suitable for use as a work roll.

DESCRIPTION OF THE PRIOR ART

Work rolls for rolling mills made from ceramic have been proposes so as to take advantage of the intrinsic high hardness and high wear resistance of the ceramic material. For instance, Japanese Patent Kokai (Laid-Open) No. 43862/74 discloses a three-layer structured composite roll for rolling mills, which composite roll has a ceramic ring at an outermost layer thereof. Also, U.S. Pat. No. 3,577,619 proposes a composite roll made up of a core and a ceramic-made sleeve, designed to be used as a work roll for rolling mills.

In these prior art rolls for rolling mills, however, ceramics is used only in a limited area on the roll surface. Above-mentioned Japanese Patent Kokai No. 43862/74 and U.S. Pat. No. 3,577,619 disclose a grooved roll specified for rolling of wires or rods, but only a part of the roll adjacent to grooves is formed of ceramics. The other part of the roll surface is formed of materials other than ceramics.

The prior art proposals shed no light on the definite construction and composition of the ceramics used method. No account is given on what materials are used for the ceramics or how the ceramic ring is made.

While there has been considerable literature in catalogs giving information concerning ceramics, few if any provide any teaching or suggestion of the application of ceramics to the rollers for rolling mills.

An object of the present invention resides in providing a roll for rolling mills which roll can be entirely made of ceramics.

Another object of the present invention resides in providing a ceramic-made roll for rolling mills which roll has a greater sheet rolling performance than steel-made rolls.

Still another object of the present invention resides in providing a ceramic-made roll for rolling mills which roll is suited for forming a satin texture on the rolled sheet surface.

In accordance with the present invention a roll for rolling mills is made by using an entirely non-metallic sintered body composed principally of at least one material selected from silicone carbide, silicon nitride, sialon, alumina and zirconia and having a relative density of 96% or more based on the theoretical density, with the roll being specified by its initial crown which falls in the range of $-300$ $\mu$m to $+300$ $\mu$m.

DETAILED DESCRIPTION

Figure 1:
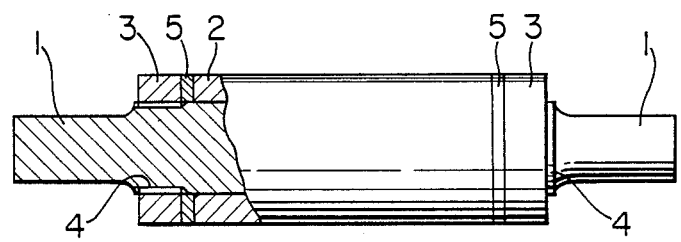
FIG. 1 is a partial cross-sectional front view, of a roll constructed in accordance with one embodiment of this invention.

The roller according to this invention can be used as a work roll or back-up roll.

The sintered body constituting the roll of this invention contains as its principal component at least one ceramic material selected from silicon carbide, silicon nitride, sialon, alumina and zirconia. The sintered body may be composed entirely of at least one ceramic material or it may at least contain other substance. When the at least one other substance is (provided) contained, it is desirble to regulate the content of such substance so that the amount of said ceramic material(s) will account for 91% by weight or more of the whole sintered body.

The at least one other substance may, for example, include sintering aids and ceramic materials other than those named above. These substances can be contained in the form of powder or fiber.

When alumina is used as the principal constituent, no sintering aid may be needed, but with other than inorganic powder than alumina as the principal constituent, it is recommended to use a sintering aid. When, for instance, silicon carbide is used as the principal constituent, it is suggested to use alumina, boron, carbon or the like as the sintering aid.

In case silicon nitride is the principal component of the sintered body, one may preferably use magnesia, yttria, beryllia alumina, aluminum nitride, silica and the like as the sintering aid.

When sialon is the principal component of the sintered body, aluminum nitride, yttria and the like may be used as the sintering aid.

In case zirconia is employed as the principal component, it is desirable to use yttria as the sintering aid.

Use of carbon as the sintering aid can achieve a satisfactory effect by mixing it in the base composition in an amount of only about 0.5% by weight. In the case of other types of sintering aids, a desired effect can be provided by a content below 7% by weight. The ceramic materials other than said silicon carbide, silicon nitride, sialon, alumina and zironia are generally excessively low in hardness in comparison with the above-named ones, so that if any of such ceramic materials (other than the above-named) is contained, the resulting sintered body proves poor in hardness and also the roll made of such sintered body is found low in wear resistance. Accordingly, it is preferred not to mix such ceramic materials, but in case such materials must be mixed as a sintering aid or for other necessity, it is desirable to confine their amount to the minimum requirement.

In view of these facts, it is desirable that at least one of silicon carbide, silicon nitride, sialon, alumina and zirconia constitutes the entirety or at least 93% by weight of the sintered body. In other words, the roll can be made completely of non-metallic sintered material having as a principal constituent at least one material selected from the group consisting of silicon nitride, sialon, alumina and zirconia.

The surface of the sintered body is entirely non-metallic. No metal should be allowed to be exposed on the sintered body surface. Generally, metal is lower in hardness than ceramic, and if metal stays exposed on the roll surface, the surface hardness of the roller tends to be scattered. When such roll is used for rolling, the metal-exposed portion alone suffers early wear. As a result, the rolled sheet has a rugged surface, and the degree of such ruggedness is augmented as the rolling progresses.

The sintered body needs to have a relative density of not less than 96%, preferably not less than 97% based on the theoretical density. The density of the sintered body is a critical factor for the strength and life of the produced roll. For example theoretically ceramic roll having a relative density of about 95% is easily broken during rolling. By making the relative density of the sintered body greater than 96%, preferably greater than 97% theoretically, it is possible to significantly increase the roll resistance to breaking or cracking under the expected rolling load.

The particle size of powdered starting materials, especially that of the ceramics used as the principal component, and the procedures for the preparation of sintered body are the important factors in achieving a high density of the sintered body which is above 96% of the theoretical density. The particle size of the materials should be as small as possible. More definitely, it is usually desirable that said particle size is in the range of 0.2 μm to 50 μm, most desirably not greater than 25 μm. However, the particle size smaller than 0.2 μm is undesirable, because in this case the powder particles tend to scatter in an atmosphere when the powder is mixed, and thus such powder is hard to treat. In case the powder particle size exceeds 50 μm, it becomes difficult to increase the density and also a high pressure is required when producing a sintered body. Further, when the powder particle size is greater than 50 μm, the sintered body is much lower in strength, especially flexural strength, than when using the powder with a particle size smaller than 50 μm.

There is also noted a tendency that the smaller the particle size of the starting powder materials, the less the particle size of the produced sintered body.

For producing a sintered body having a relative density of not less than 96% based on the theoretical of, it is desirable according to the invention to employ a pressure sintering method. As such pressure sintering method, it is suggested to use, for example, a hot press method or a hot isostatic press (HIP) method. The hot press method is a method in which starting powder materials are mixed and molded under normal pressure and then the molding is placed in a die and heated to a required temperature in a mechanically pressed state to thereby sinter the molding.

A sintered body produced by this hot press method, which contains 95% by weight or more of silicon nitride with small quantities of alumina and yttria and which has a relative density greater than 97% based on the theoretical density, can have the flexural strength of about 100 Kgf/mm$^2$ at a temperature below 1,000° C.

According to the HIP method, starting powder materials are mixed and preformed and this preform is sintered by heating it to a determined temperature under a high pressure in an inert gas such as argon gas.

For instance, a sintered body made from silicon nitride as a principal component and yttria as a sintering aid by the HIP method exhibits a density near to the theoretical density even if the amount of yttria is as small as 0.5% by weight.

When a sintered body is produced by the or HIP method, it is possible to increase the density of the sintered body by elevating the sintering temperature, pressure, pressing time. Regarding the sintering temperature, for instance, with silicon nitride being used as a principal component, the density of the sintered body increases sharply, reaching near the theoretical density, when the sintering is conducted at a temperature above 1,500° C.

The roll for rolling mills bends during under a loaded condition. In case the roll used for hot rolling, it is also swells due to thermal expansion. When the roll is deformed, the rolled sheet becomes uneven in thickness along its width, that is, the thickness of the middle part of the sheet (along its width) becomes greater or less than the thickness at both the ends. To prevent unevenness of sheet thickness from the deformation of the roll during the rolling operation, a either convex or concave crown is provided on the roll. The initial crown adapted to the roll of this invention can be less than 300 μm whether it is convex or concave because the deformation that could occur on the roll of this invention due to thermal expansion is very small.

The sintered bodies of silicon carbide, silicon nitride, alumina and zirconia, when so worked as to have the theoretical density or a density close thereto, exhibit the properties such as shown in Table 1. For the purpose of comparison, the properties of steel and a sintered cement composed of tungsten carbide powder and cobalt are also shown in Table 1.

TABLE 1

| Properties | Materials | | | | | |
|---|---|---|---|---|---|---|
| | Steel | WC-Co | SiC | Si$_3$N$_4$ | Al$_2$O$_3$ | ZrO$_2$ |
| Vickers hardness (Kgf/mm$^2$) | 900 | 1,500 | 3,300 | 3,000 | 1,800 | 1,300–1,500 |
| Young's modulus (Kgf/mm$^2$) | 21,000 | 60,000 | 40,000 | 30,000 | 37,000 | 15,000–20,000 |
| Coefficient of thermal expansion (1/°C.) | $10 \times 10^{-6}$ | $4.9 \times 10^{-6}$ | $4.2 \times 10^{-6}$ | $3.7 \times 10^{-6}$ | $7.9 \times 10^{-6}$ | $9 - 10.5 \times 10^{-6}$ |

The ceramic roll of this invention has a Vickers hardness (Hv) of 1,300–3,500 Kgf/mm$^2$ on its surface, which is much higher than that of the steel roll. Due to such high hardness, the roll suffers little wear and can be used semipermanently for rolling of stainless steel, soft steel, etc. The use of the roll of this invention further provides the following effects. Since the whole surface of the roll of this invention is non-metallic, the roll prevents coalescence to rolled sheet and resistance to adhesion of a rolled sheet resulting in an increased working life of the roll. Further, even upon the occurrence of an abnormal situation such as slipping of the roll or rolling of a sheet with one part thereof lying on the other, the occurrence of a coalescence of the metal sheet to the ceramic roll minimized, and hence the risk of the work roll to cause the coalescence is small. Also, even if the work roll surface is heated to a high temperature, of, for example 1,000° C., deterioration in a quality of the roll is minimal because the texture stability of a ceramic material is by far greater than that of an iron and steel material.

The ceramic roll still maintains high strength and high resistance to oxidization even at so high a temperature as 1,000° C., so that it shows excellent durability when it is used as a work roll for hot rolling.

The Young's moduli of the alumina, silicon carbide and silicon nitride sintered bodies are about 37,000, 40,000 and 30,000 Kgf/mm$^2$, respectively, which are approximately 1.5 to 2 times higher than that (about 21,000 Kgf/mm$^2$) of iron and steel material.

Generally, use of a work roll with a large modulus of elasticity permits a reduction of the energy required for rolling and also rolling to a smaller thickness. Therefore, by using the ceramic roll of this invention as a work roll, it is possible to reduce the rolling energy and to improve the sheet rolling performance.

By using a ceramic roll as a work roll and a steel roll as a back-up roll, there can be obtained the following effect as compared with the case where a combination of ceramic rolls is used. When ceramic rollers contact each other, the deformation at the contacted part thereof is small in both the rolls, so that an objectionably high contact surface pressure is produced, but in case a ceramic roll and a steel roller are contacted, a large deformation occurs on the steel roll having a lower modulus of elasticity, causing an increase of contact area and a corresponding decrease of pressure on the contact area. As a result, the roll reliability for spalling and other working is enhanced. In case a ceramic roll is used in combination with a steel roll, the latter undergoes an elastic deformation in such a way that it is indented by the former, resulting in an increased coefficient of friction between both the rolls, which proves helpful for preventing the occurrence of slippage between both the rolls.

It is important for the roll of this invention that at least the surface of its body portion be formed from a sintered ceramics which is principally composed of at least one material selected from silicon carbide, silicon nitride, sialon, alumina and zirconia. The roll may be formed in its entirety from said sintered ceramics, or only the surface layer of the roller body portion may be formed from said sintered ceramics, with other part of the roll being made of a different material, forming a composite roll. No method for forming a composite structure is specifically defined; however a preferred method is to make a sleeve from said sintered ceramics and fit it on a core made of steel or other materials. For securing such sleeve to the core, there can be employed suitable means such as shrink fit, screwing, bonding by an adhesive, etc.

The composite roll may not necessarily be of a two-layer structure consisting of a ceramic layer composed principally of at least one of silicon carbide, silicon nitride, sialon, alumina and zirconia and a layer of a different material, it may be of a multiple-layer structure. In the case of a two-layer structured composite roller, it is desirable that the material used for the core is one which has a greater bending strength than the sintered ceramics forming the roller surface portion. Use of steel for the core is most desirable. In case the roll structure is composed of two or more layers, it is desirable to so design the structure that its bending strength becomes greater proportionally to the distance from the roll surface. In case steel is used for the core of a composite roll, it is most desirable to use zirconia as the principal component of the sintered ceramics which forms the roll surface portion. Zirconia is akin to steel in coefficient of thermal expansion as seen from Table 1, so that when the roll temperature elevates during the rolling work, the thermal stress which builds up in the ceramic and steel contacting area can be minimized.

In case of making a composite roll by fixing a ceramic sleeve on the core made of steel or other materials, it is desirable to fix the same in such a manner that a compression stress will be produced in the axial direction of the sleeve. A typical and preferred method for such fixing is to first fit the sleeve on the core and then tighten the sleeve in its axial direction by using a threaded ring or other suitable means. This method will be explained below with reference to FIGS. 1 and 2.

In FIG. 1, a ceramic-made sleeve 2 is fastened to the core 1 by a threaded engagement between the external threads 4 on the core 1 and the internal mating threaded parts 3 through washers 5. The compression stress that develops in the sleeve 2 can easily be controlled by adjusting the clamping torque of the internally threaded parts 3. In the roll of FIG. 1, the sleeve 2 is made of a high-strength sintered ceramics such as sintered alumina, silicon carbide, silicon nitride or zirconia. The other parts are made of steel. As the sleeve fastening means, one may employ, beside the above-mentioned way, a method in which the core 1 is previously heated to a predetermined temperature. The core 1 expands when it is heated, so that if the other parts, namely sleeve 2, washers 5 and internally threaded parts 3 are properly set on the core in a heated state and the internally threaded parts 3 lightly clamped, the sleeve 2 is tightened by itself as the core 1 is shrunk upon cooling. The clamping force can be regulated by properly selecting the heating temperature. Needless to say, the similar effect can be obtained when assembling the parts with the sleeve 2 in a cooled state. In FIG. 1, the internally threaded parts 3 are provided at both the ends of the sleeve 2, but is possible to provide one of them in the way described above while providing the other as an integral part of the core 1.

Figure 2:
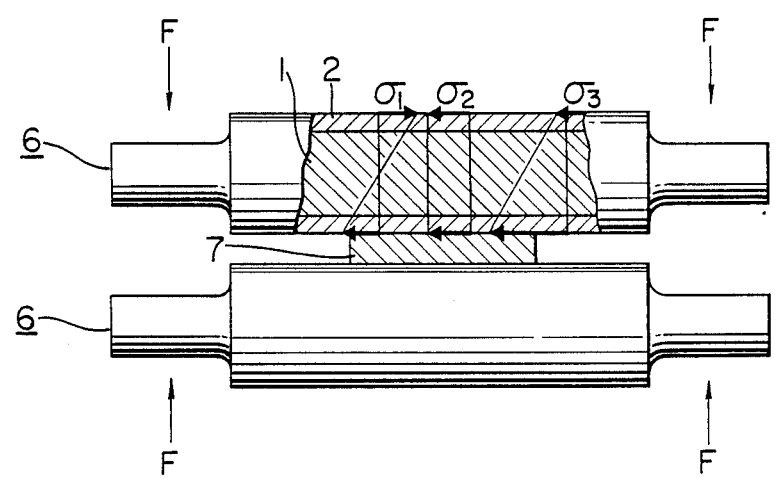
FIG. 2 is a partially schematic cross-sectional front view, of a mode of rolling by a pair of roll shown in FIG. 1.

FIG. 2 schematically illustrates the amplitude of stress in the inside of the sleeve 2 in the case that the sleeve roll of FIG. 1 was used for a two-high rolling mill. In FIG. 2, the rightwardly directed arrows represent the tensile stress and the leftwardly directed arrows represent the compression stress. When the rolling sleeve rollers 6 are driven to rotate with applying a pressing force F in the direction of arrow at both the ends of each sleeve roll 6, a work 7 is rolled. During this operation, each sleeve roll receives a bending moment, and the maximum tensile stress produced thereby in the sleeve 2 is expressed by $\sigma_1$. The sleeve 2 is already given a compression stress $\sigma_2$. The stress which actually builds up in the sleeve 2 is the composition of $\sigma_1$ and $\sigma_2$. That is, $\sigma_3 = \sigma_1 + \sigma_2$. Since $\sigma_1$ is a tensile stress and $\sigma_2$ is a compression stress, the tensile stress $\sigma_3$ which actually develops in the sleeve is smaller than $\sigma_1$, and when the absolute value of $\sigma_2$ is greater than $\sigma_1$, $\sigma_3$ becomes the compression stress. In any way, it is possible to reduce the tensile stress which builds up in the sleeve, so that the ceramic material which is low in resistance strength to tensile stress can be used for the sleeve.

In the case of making a composite roll by fitting a ceramic sleeve on the core, it is desirable to select the sleeve thickness to be not less than 5 mm in consideration of the mechanical strength of ceramics.

Figure 4:
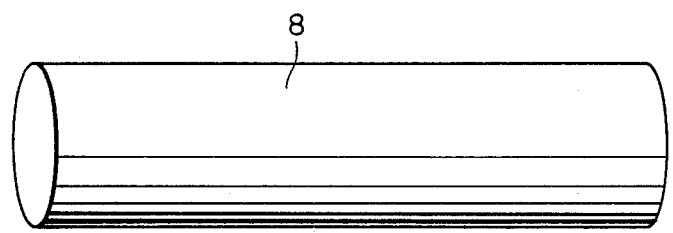
FIG. 4 is a perspective view of a work roll in the form of a solid cylindrical bar having a sintered non-metallic body in accordance with another embodiment of the present invention.

In case an integral roll in the form of a solid cylindrical bar 8 shown in FIG. 4 is made from a sintered ceramics principally composed of at least one of silicon carbide, silicon nitride, sialon, alumina and zirconia, it is possible to construct the roll in such a manner that it is hard in the surface portion and soft in the inside. This can be attained, for example, by mixing a metal powder or fiber only in the area near the center of the roll when mixing the materials and preforming the mixture into a roll. In this structure, though the roller surface is entirely non-metallic, metal exists in the inside, so that the inside portion of the roll becomes softer and more ductile than the surface portion. In the case of a roll of such integral structure, the thickness of the non-metallic roll surface layer need not be greater than 3 mm.

A multiple-layer structure composite roll can be made by forming the surface layer from a ceramic material while forming the core with a cement composed of a composite sintered body of tungsten carbide and cobalt. It is also possible to make a roll of a three-layer structure consisting of a surface ceramic layer, a succeeding cement layer and a steel core.

The roll of this invention is capable of rolling to thin sheets, but for obtaining a sheet with good gloss, the roller surface roughness should be less than 1 $\mu$m. The minimum thickness to which the work can be rolled is decided by the material quality of the roll. Generally, the greater the Young's modulus of a roll material, the less the thickness of a roller sheet can be made. The ceramic-made roll of this invention has a Young's modulus of 15,000 to 40,000 Kgf/mm$^2$, which is much greater than that of steel, and is, therefore, excellent in sheet rolling performance (capable of rolling a sheet to a very small thickness). Further, since the roll surface is entirely non-metallic, the rolled sheet has excellent surface smoothness. It is possible to further enhance the glossiness of the rolled sheet surface by regulating the roll surface roughness to less than 1 $\mu$m, preferably less than 0.4 $\mu$m.

There are the cases where it is desired to obtain a rolled sheet having a stain texture rather than a smooth and glossy surface. For instance, in the case of a metal sheet whose surface is to be plated for practical use, the sheet surface needs to be worked into a satin texture for good adhesion to metallic deposit. When the roll of this invention is so worked that is surface roughness will be 3 to 10 $\mu$m, especially 4 to 6 $\mu$m, it is capable of forming a satin texture best suited as plating ground. Further, since such surface roughness of the roll of this invention can be maintained in substantially the same state until the roll becomes disused due to break or for other reasons, it is possible to form a satin texture of a constant shape and roughness on the rolled sheets from first to last. In the case of using a steel-made roll for forming a satin texture on the stainless steel sheets, the roll surface wears and becomes flat after continuous 1,000-meter rolling work, so that when such stage was reached, the mill must be shut down even if the rolling work is not finished, and the work roll must be replaced with new one or it must be dismounted, subjected to a proper surface working such as shot blasting and then remounted in the mill. The time and cost required for such roll replacement or renewal can in no way be neglible, and, in fact, this is even considered as one of the serious defects of steel-made rolls. According to this invention, it is possible to eliminate such problem inherent to the steel-made rolls.

In case the ceramic-made roll of this invention is used as a work roll, it is desirable to regulate its hardness in such a manner that the ratio of hardness (Vickers hardness) of the work roll (WR) to that of the back-up roll (BR) (WR hardness/BR hardness) will be about 2 or higher. By so doing, it is possible to prevent the work roll from being damaged in case an alien matter such as, for example, oxide scale on a work (sheet to be rolled) or rolls was caught in between the work and back-up rolls. It was found that according to such roll design, any damage resulting from take-up of an alien matter occurs on the back-up roll side, and the work roll side remains safe from such damage. Thus, the use of the roll of this invention has eliminated by possibility that damage be inflicted to the work roll by a take-up of an alien matter and transferred to the rolled sheet.

The Vickers hardness of steel is about 900 Kfg/mm$^2$ at highest even if alloy steel generally used for work rolls is taken into consideration. In contrast, the ceramic-made roll has a Vickers hardness above 1,300 Kgf/mm$^2$ even when it is made of a sintered body of zirconia which is lowest in hardness among the said ceramic materials used in this invention. Therefore, it can easily be realized to construct a four-high rolling mill by forming the back-up roll from steel of a suitable hardness while forming the work roll from ceramics and making the Vickers hardness of the working roll at least twice the Vickers hardness of the back-up roll.

In the case of forming the work roll from ceramics while forming the back-up roll from steel, it is desirable that the ceramic-made roll is designed as a simple round bar 8 as shown in FIG. 4 while the back-up roll which has good machinability is properly machined and provided with a driving shaft so that the back-up roll is rotated.

In the case of constructing the work roll as a composite roll using steel as core, such work roll may be provided with a driving shaft so that it is rotated.

EXAMPLE 1

Stainless steel SUS 304 was rolled by using a roll made of a silicon carbide sintered body as a work roll and an alloy steel-made roll with a Vickers hardness of 900 Kgf/mm$^2$ as a back-up roll. The Vickers hardness of the work roll was about 3,300 Kgf/mm$^2$, approximately 2.7 times the hardness of the back-up roll. The sintered body contained 1% by weight of boron carbide and its relative density was 98% based on the theoretical density. It was made by hot press. The powdered materials used for making the sintered body had an average particle size of about 0.7 $\mu$m. The work roll was formed as a simple round bar 8 as shown in FIG. 4 and the back-up roll was provided with a driving shaft by properly machining and this back-up roll was rotated. The rolling mill in this example is so designed that when the back-up roll is rotated, the work roll is urged to rotate correspondingly with a frictional force.

When the alien matters such as iron oxide scale, steel chips and such were artificially put in between the work roll and back-up roll, the dents were formed on the back-up roll but no flaw could be found on the work roll with the naked eye. In actual rolling of stainless steel plates, there was noted on transfer of flaws on the rolls onto the rolled sheet and it was possible to obtain the flawless rolled sheets.

EXAMPLE 2

The same experiment as in Example 1 was conducted by using a roll made of a silicon nitride sintered body as a work roll. The alien matter caught in between the two rolls gave dents on the back-up roll alone, and the work roll remained free of any flaw. The Vickers hardness of the silicon nitride sintered body was about 3,000 Kgf/mm$^2$.

The sintered body contained 2% by weight of yttria and 1% by weight of alumina as sintering aids. This sintered body was made by hot press and had a relative density of about 99% based on the theoretical density. The starting powdered materials were about 1 μm in average particle size.

EXAMPLE 3

The experiment of Example 1 was carried out by using as the work roll a roll made of an alumina sintered body having a Vickers hardness of about 1,800 Kgf/mm$^2$ and a density close to the theoretical density. The back-up roll suffered no dent due to take-in of alien matter.

The sintered body was made by hydrostatic press molding, followed by sintering, and its relative density was 98.5% based on the theoretical density. The starting powder had a particle size of 3 μm.

EXAMPLE 4

Rolling of a soft steel plate and an aluminum plate was carried out by using a work roll made of a silicon carbide sintered body and a back-up roll made of alloy steel, said back-up roll being driven to rotate. The sheet rolling performance and the gloss of the rolled sheets were compared with those obtained when using the steel-made work roll.

The work roll made of a silicon carbide sintered body was a round bar of 50 mm in diameter and 150 mm in length with a Vickers hardness of about 3,000 Kgf/mm$^2$. The sintered body was composed of silicon carbide and a sintering aid. The sintering aid consisted of boron carbide (1% by weight). The sintered body was made by hot press by using the powdered materials with a particle size of 0.7 μm. Its relative density was about 98% based on the theoretical. The work roll was non-metallic in its entire structure. The modulus of elasticity of the ceramic was about 40,000 Kgf/mm$^2$. The surface roughness of the work roll was about 0.6 μm.

The results of rolling showed almost no difference in gloss of the rolled sheet between both the cases of ceramic-made work roll and steel-made work roll, and in both the cases the rolled sheets had a good glossy surface.

Figure 3:
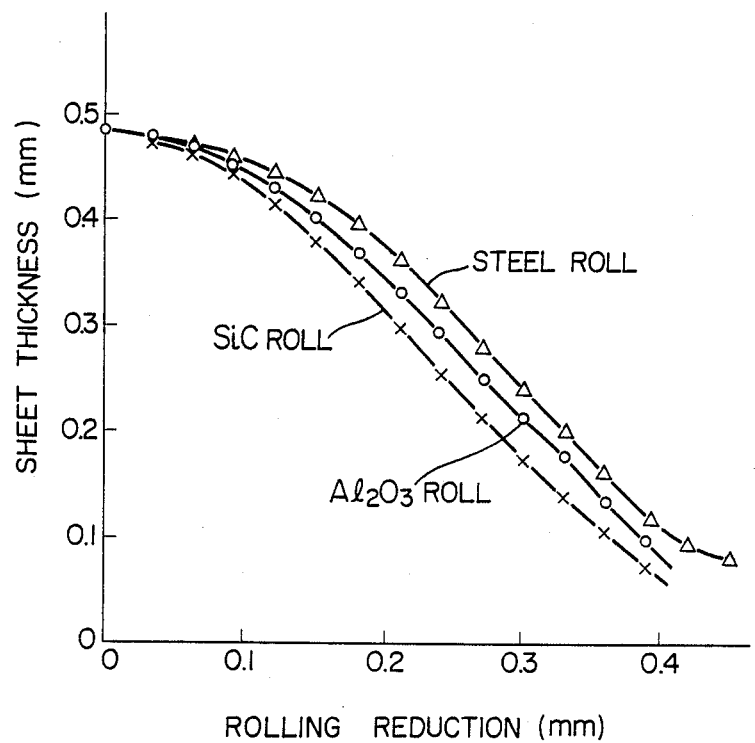
FIG. 3 is a graphical illustration of a relationship between thickness of sheet to be rolled and a rolling reduction through various roll.

FIG. 3 shows the relation between rolled sheet thickness and rolling reduction when a soft steel plate was rolled. It will be seen that the ceramic-made work roll requires less rolling reduction than the steel-made work roll for obtaining a rolled sheet of a desired thickness.

As the rolling reduction increases the rolled sheet thickness naturally becomes smaller, but when the rolling reduction reaches a certain level, the rolled sheet thickness is no longer lowered even if the rolling reduction is further increased. In the case of a steel-made work roll, it is noted that the rolled sheet thickness lessens at an almost equal rate in accordance with the increase of rolling reduction until it reaches 0.4 mm, but when the rolling reduction exceeds 0.4 mm, the lessening rate of rolled sheet thickness is diminished. This signifies that the thickness that can be lessened by rolling is close to its limit.

In the case of a ceramic-made work roll, a greater range of rolling reduction is allowed to be selected till reaching the rolling limit than in the case of a steel-made work roll. Thus, the ceramic-made work roll has a higher sheet rolling performance.

EXAMPLE 5

A soft steel plate, an aluminum plate and a stainless steel plate were rolled by using a work roll made of an alumina sintered body and an alloy steel-made back-up roll, said back-up roll being rotated. And the sheet rolling performance and the surface glossiness of the rolled sheets were compared with those provided when using a steel-made work roll.

The work roll made of an alumina sintered body was a round bar measuring 50 mm in diameter and 150 mm in length and having a Vickers hardness of about 1,800 Kgf/mm$^2$. The sintered body contained no sintering aid and was substantially composed of alumina alone. It was made by molding the powdered materials of 3 μm in particle size by hydrostatic press molding and then sintering the molding. The relative density of this alumina sintered body was 98.5% based on the theoretical density and the modulus of elasticity was about 37,000 Kgf/mm$^2$.

The optical micrographical examinations of the rolled sheets showed that any of the soft steel, aluminum and stainless steel sheets rolled by using the alumina-made work roll had a flawless, beautiful surface, but the sheets rolled by using the steel-made work roll all had many flaws on the surface. These flaws were like scratches made by a metal brush.

The soft steel plate rolling performance by the alumina-made work roll was as shown in FIG. 3, which indicates the higher sheet rolling performance of the alumina-made work roll than that of the steel-made work roll.

As described above, this invention has realized an entirely ceramic-made roll for rolling mill. The roll of this invention is superior to steel-made in sheet rolling performance as well as in the ability of forming a satin texture on the rolled sheet surface.

What is claimed is:

1. A roll for strip sheet rolling mills, the roll being mounted as a work roll in a rolling mill and being a solid cylindrical bar having an axial length larger than a diameter thereof, said roll is an entirely non-metallic sintered body comprising a principal component of at least one material selected from the group consisting of silicon carbide, silicon nitride, sialon, alumina and zirconia and has a density of at least 96% of the sintered body theoretical density, said roll having an initial crown in a range of −300 μm to +300 μm.

2. The roll for rolling mills according to claim 1, wherein the Vickers hardness of said sintered body is 1,300–3,500 Kgf/mm$^2$.

3. The roll for rolling mills according to claim 1, wherein the Young's modulus of said sintered body is 15,000–40,000 Kgf/mm$^2$.

4. The roll for rolling mills according to claim 1, wherein said sintered body is substantially composed of only one material selected from silicon carbide, silicon nitride, sialon, alumina and zirconia.

5. The roll for rolling mills according to claim 1, wherein said sintered body is composed of 93-99.5% by weight of at least one of silicon carbide, silicon nitride, sialon, alumina and zirconia and the balance of a sintering aid.

6. The roll for rolling mills according to claim 1, wherein a powder of at least one material selected from silicon carbide, silicon nitride, sialon, alumina and zirconia used for making the sintered body has a particle size of 0.2–50 μm.

7. A roll for a strip sheet rolling mill, the roll being a round bar made of an entirely non-metallic sintered body comprising a principal constituent of at least one material selected from the group consisting of silicon carbide, silicon nitride, sialon, alumina and zirconia, and having a density of at least 96% of the sintered body theoretical density, and having a surface roughness of 3–10 μm and an initial crown in the range of −300 μm to +300 μm, wherein said roll is arranged to cooperate with a driven back up roll so as to enable a rolling of strip sheets.

8. A roll for a strip sheet rolling mill, the roll being a solid cylindrical bar having an axial length larger than a diameter thereof and being made of an entirely non-metallic sintered body comprising a principal constituent of at least one material selected from the group consisting of silicon carbide, silicon nitride, sialon, alumina and zirconia, and having a density which is at least 96% of the sintered body theoretical density, said roll having a surface roughness of 3–10 μm to +300 μm.

9. A roll for a strip sheet rolling mill, the roll being a round bar having an axial length larger than a diameter thereof and being hollow along a center axis thereof and being made of an entirely non-metallic sintered body comprising at least one material selected from the group consisting of silicon carbide, silicon nitride, sialon, alumina, and zirconia, and having a density, of at least 96% of the sintered body theoretical density and having an initial crown in the range of −300 μm to +300 μm, wherein said roll is arranged to cooperate with a driven back up roll so as to enable a rolling of the sheet.

10. A rolling mill including a pair of work rolls for rolling a strip sheet, at least one pair of back up rolls, and a housing means for supporting said work rolls and said back up rolls, the improvement comprising at least one of said work rolls being a sintered ceramic body comprising at least one ceramic material selected from the group consisting of silicon carbide, silicon nitride, sialon, alumina, and zirconia, and having a density of at least 96% of the sintered body theoretical density, and Young's modulus of 15,000–40,000 Kgf/mm$^2$, the work rolls for rolling the sheet having a predetermined axial length larger than a diameter thereof for enabling a rolling of the strip sheet and a predetermined initial crown on a surface thereof not greater than 300 μm.

11. The rolling mill according to claim 10, wherein a Vickers hardness of the sintered ceramic body is 1300–3500 Kgf/mm$^2$.

12. The rolling mill according to claim 10, wherein said sintered ceramic body is substantially composed of only one material selected from silicon carbide, silicon nitride, sialon, alumina, and zirconia.

13. The rolling mill according to claim 10, wherein said sintered ceramic body is composed of 93–99.5% by weight of at least one of silicon carbide, silicon nitride, sialon, alumina, and zirconia and the balance of a sintering aid.

14. The rolling mill according to claim 10, wherein a powder of at least one material selected from silicon carbide, silicon nitride, sialon, alumina and zirconia used for making the sintered ceramic body has a particle size of 0.2–50 μm.

15. A work roll for a strip sheet rolling mill, the work roll including means for rolling a strip sheet and being a solid cylindrical sintered ceramic body of at least one ceramic material selected from the group consisting of silicon carbide, silicon nitride, sialon, alumina, and zirconia, and having a density of at least 96% of the sintered body theoretical density and a Young's modulus of 15,000–40,000 Kgf/mm$^2$, the means for rolling a sheet having a predetermined axial length larger than a diameter thereof for enabling a rolling of the sheet and having a predetermined initial crown on a surface thereof not greater than 300 μm.

16. The work roll according to claim 15, wherein a Vickers hardness of said sintered ceramic body is 1300–3500 Kgf/mm$^2$.

17. The work roll according to claim 15, wherein said sintered body is substantially composed of only one material selected from silicon carbide, silicon nitride, sialon, alumina, and zirconia.

18. The work roll according to claim 15, wherein said sintered ceramic body is composed of 93%–99.5% by weight of at least one of silicon carbide, silicon nitride, sialon, alumina, and zirconia and the balance of a sintering aid.

19. The work roll according to claim 15, wherein a powder of at least one material selected from silicon carbide, silicon nitride, sialon, alumina, and zirconia used for making the sintered ceramic body has a particle size of 0.2 μm–50 μm.

* * * * *